(12) United States Patent
Lee

(10) Patent No.: US 11,883,919 B2
(45) Date of Patent: Jan. 30, 2024

(54) AUTOMATIC FIXTURE REPLACEMENT MECHANISM FOR MACHINE TOOL

(71) Applicant: Cheuk Bun Lee, Fo Tan (HK)

(72) Inventor: Cheuk Bun Lee, Fo Tan (HK)

( * ) Notice: Subject to any disclaimer, the term of this patent is extended or adjusted under 35 U.S.C. 154(b) by 165 days.

(21) Appl. No.: 17/341,882

(22) Filed: Jun. 8, 2021

(65) Prior Publication Data

US 2021/0379712 A1    Dec. 9, 2021

(30) Foreign Application Priority Data

Jun. 8, 2020 (HK) .......................... 32020008864.1

(51) Int. Cl.
| | | |
|---|---|---|
| *B23Q 7/04* | (2006.01) | |
| *B23Q 3/10* | (2006.01) | |
| *B23Q 3/06* | (2006.01) | |
| *B23Q 7/10* | (2006.01) | |

(52) U.S. Cl.
CPC ............... *B23Q 7/045* (2013.01); *B23Q 3/06* (2013.01); *B23Q 3/101* (2013.01); *B23Q 3/105* (2013.01); *B23Q 7/10* (2013.01)

(58) Field of Classification Search
CPC ................ B25J 15/0475; B25J 15/0433; B25J 15/0019; B23Q 7/1426; B23Q 1/0081; B29C 45/1756; Y10T 483/17
USPC ........................................................ 269/900
See application file for complete search history.

(56) References Cited

U.S. PATENT DOCUMENTS

| | | | | |
|---|---|---|---|---|
| 4,512,709 | A * | 4/1985 | Hennekes | B23Q 1/0063 901/41 |
| 4,604,787 | A * | 8/1986 | Silvers, Jr. | B23Q 7/046 414/730 |
| 6,073,512 | A * | 6/2000 | McCormick | G05G 5/06 74/543 |
| 6,641,511 | B2 * | 11/2003 | Patel | B23Q 7/048 483/54 |
| 9,163,766 | B2 * | 10/2015 | Maffeis | F16L 39/00 |
| 9,656,395 | B2 * | 5/2017 | Youngwerth | B23Q 7/04 |
| 10,259,127 | B2 * | 4/2019 | Bellandi | B25J 19/0033 |
| 2004/0192524 | A1 * | 9/2004 | Nolte | B05B 13/0431 483/59 |
| 2010/0090458 | A1 * | 4/2010 | Schulz | F16L 37/367 285/26 |

* cited by examiner

*Primary Examiner* — Lee D Wilson
*Assistant Examiner* — Robert F Neibaur
(74) *Attorney, Agent, or Firm* — Muncy, Geissler, Olds & Lowe, P.C.

(57) ABSTRACT

Automatic fixture replacement mechanism for machine tool, wherein includes multiple sets of fixtures for installing work pieces to be processed and a movable manipulator for loading fixture; the movable manipulator is installed on a two-dimensional movable mechanism; the movable manipulator is provided with a pull nail that is fastened to the clamp and the fixture is provided with a pin hole matching with the pin. For batch processing of a large number of work pieces with multiple fixtures, the use of movable manipulator to automatically install and unload fixtures can greatly improve the efficiency of processing. The structure of the mechanism and the operation are simple so that it is reliable and easy to be implemented. Hence, it can be widely used in various types of CNC machining centers.

8 Claims, 3 Drawing Sheets

AUTOMATIC FIXTURE REPLACEMENT MECHANISM FOR MACHINE TOOL

FIELD OF THE INVENTION

The invention involves an automatic fixture replacement mechanism for machine tool

BACKGROUND OF THE INVENTION

In machine tool, such as CNC machining centers, the fixture is installed on the workbench and the workpieces are generally being clamped on the fixture during processing, and the appropriate tool from the tool turret is then selected to process the workpieces by the movement between the workbench and the spindle. At present, there is no device for automatically installing fixtures to CNC machining centers and the fixtures must be installed manually. When processing similar workpieces in batches, fixture installation will waste a lot of manpower, thereby affecting production efficiency.

SUMMARY OF THE INVENTION

In view of the aforesaid drawbacks of the prior art, the present invention provides an automatic fixture replacement mechanism for machine tool to realize the automatic clamping and unloading of the fixture, which greatly improves the production efficiency.

Automatic fixture replacement mechanism for machine tool, wherein includes multiple fixtures for installing workpieces and movable manipulator for loading fixtures; the movable manipulator is installed on at least one two-dimensional moving mechanism, the movable manipulator is provided with pins that are buckled with the fixture, and the corresponding fixture is provided with pin holes matching the pins; while installing the fixture, the pins of the movable manipulator and the pin holes of the fixture are matched, and the moving mechanism drives the movable manipulator to hold the fixture and move it to the machine and fix, then the pins and pin holes are loosened; when processing of the workpieces finishes, the pins of the movable manipulator match with the pin holes of the fixture and the moving mechanism drives the movable manipulator to move the fixture out of the machine tool and move it to the storage position, then the pins and pin holes are loosened.

Furthermore, the fixture is provided with a pin plate, and several gourd-shaped pin holes are arranged in the pin plate.

Furthermore, the pin including a column shape small-diameter section and a column shape large-diameter end, and the diameter of the small-diameter section is less than or equal to the diameter of the small hole of the gourd-shaped pin hole, the diameter of the large-diameter end is greater than the diameter of the small hole of the gourd-shaped pin hole and is less than or equal to the diameter of the large hole of the gourd-shaped pin hole.

Furthermore, the moving mechanism is the tool turret of the machine tool; the tool turret of the machine tool is equipped with cutting tools and the movable manipulator; when the fixture is installed or unloaded, the tool turret rotates to place the movable manipulator to the working position for grabbing fixtures.

Furthermore, the machine tool is provided with a rack for placing the fixtures.

Furthermore, the rack is provided with several ring grooves matched with the pin plates; the ring groove is provided with upward openings, the pin plates of the fixtures are inserted and fixed into the ring grooves through the upward openings.

Furthermore, the ring groove and the pin plate are provided with a jack and a socket for positioning, the jack matches with the socket to position the ring groove and the pin plate.

Furthermore, the edge of the pin holes is provided with a chamfer; correspondingly, the pin is also provided with a chamfer on the inner side where fits the pin hole.

Furthermore, the angle of the chamfer is 30°.

The invention has the following advantages: for batch processing of batch workpieces with multiple fixtures, use a movable manipulator to grab and install the fixtures on the machine tool. After processing, the movable manipulator uninstalls the fixtures to realize automatic installation and unloading fixtures. It can greatly improve the processing efficiency. The structure of the mechanism and the operation are simple so that it is very reliable and easy to be realized for wide adoption among various types of CNC machining centers.

BRIEF DESCRIPTION OF THE DRAWINGS

Below are explanations of the invention combined with drawings.

In the figures: 1. the fixture, 2. the movable manipulator, 3. the pin, 4. the pin hole, 5. the pin plate, 6. the small-diameter section, 7. the large-diameter end, 8. the small hole, 9. the large hole, 10. the rack, 11. the ring groove, 12. the jack, 13. the socket, 14. the chamfer.

DESCRIPTION OF THE EMBODIMENTS

Figure 1:
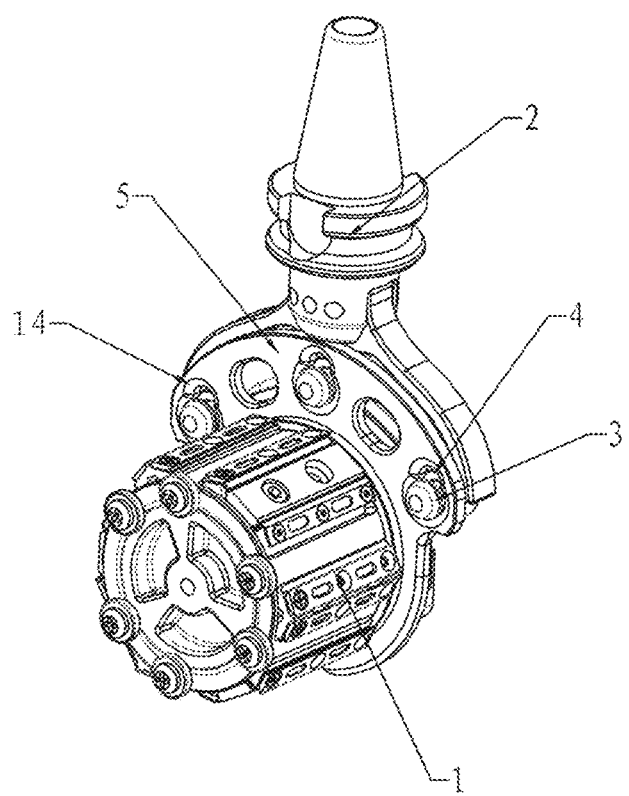
FIG. 1 is the perspective view of the present invention.
Figure 2:
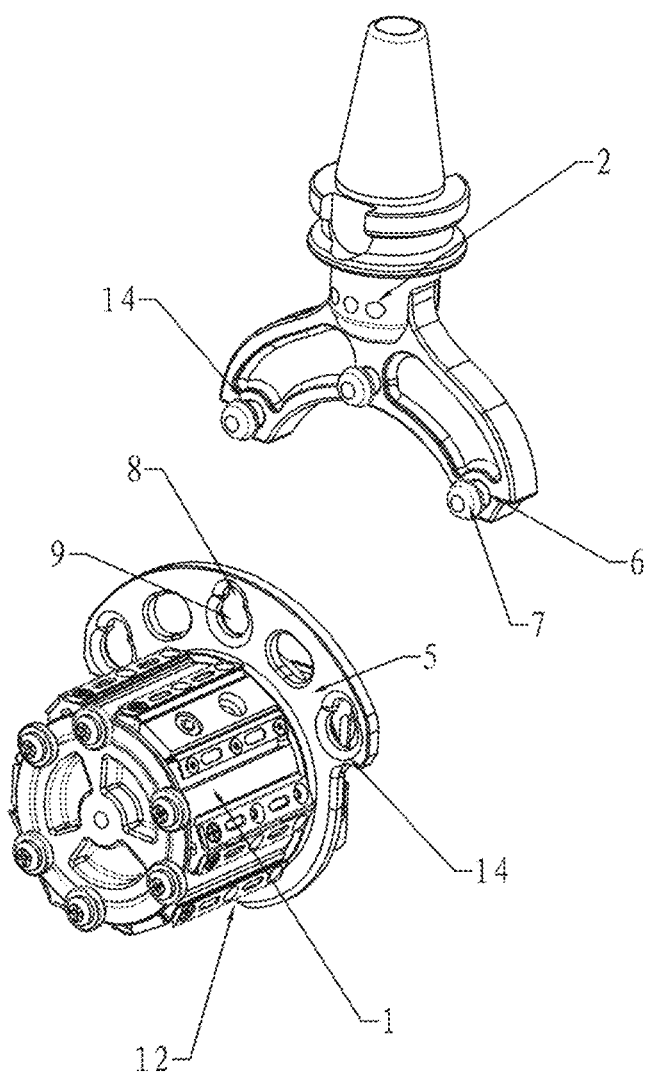
FIG. 2 is the exploded view of FIG. 1.
Figure 3:
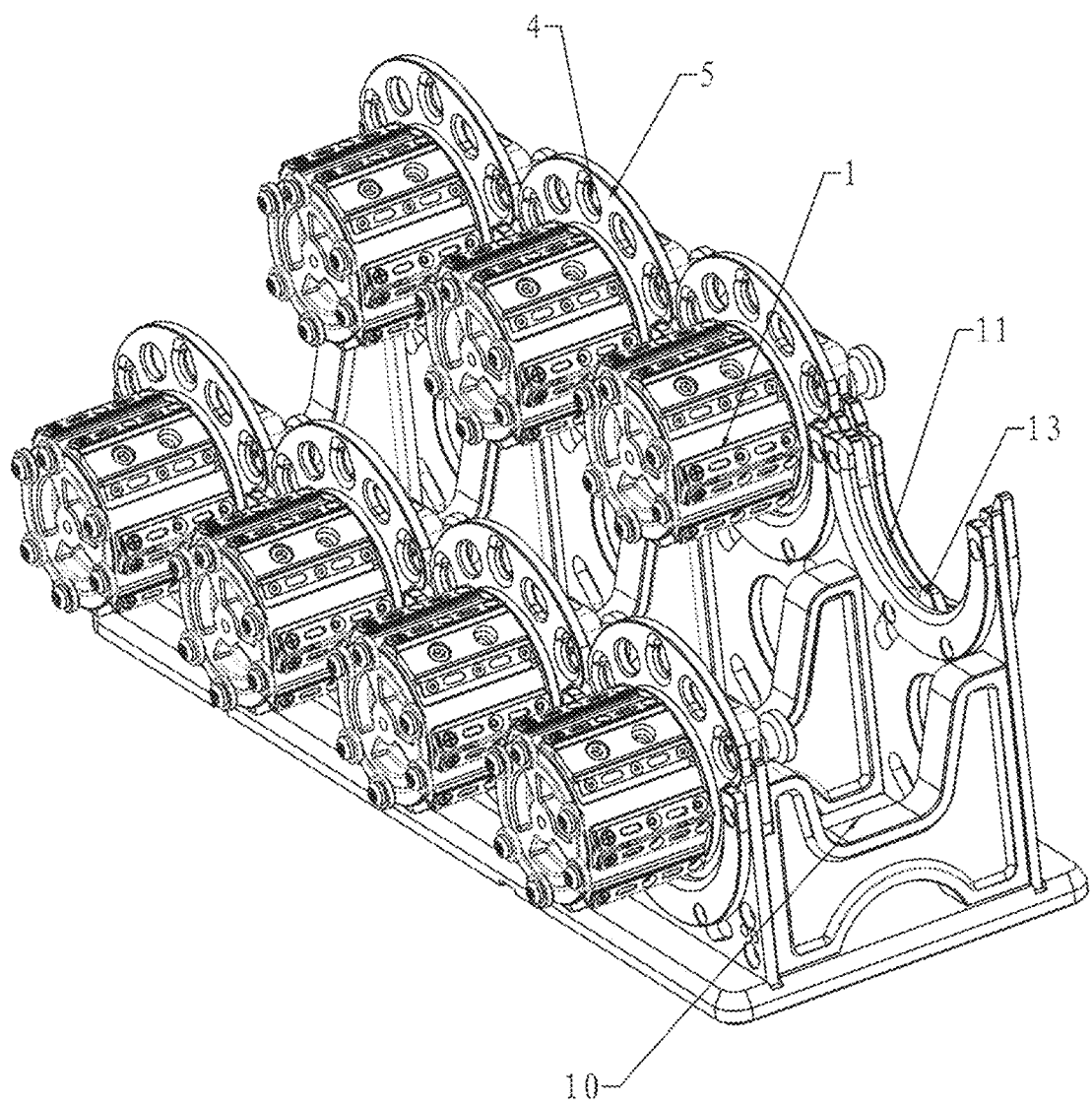
FIG. 3 is the perspective view of the rack with the fixture.

Refer to FIG. 1, the automatic fixture replacement mechanism for machine tool, includes multiple fixtures 1 for installing workpieces and movable manipulator 2 for loading fixtures. The movable manipulator 2 is installed on at least one two-dimensional moving mechanism, the movable manipulator 2 is provided with pins 3 that are buckled with the fixture 1, and the corresponding fixture 1 is provided with pin holes 4 matching the pins 3. While installing the fixture 1, the pins 3 of the movable manipulator 2 and the pin holes 4 of the fixture 1 are matched, and the moving mechanism drives the movable manipulator 2 to move the fixture 1 and fix it onto the machine, then the pins 3 and pin holes 4 are loosened; when processing of the workpieces finishes, the pins 3 of the movable manipulator 2 match with the pin holes 4 of the fixture 1, and the moving mechanism drives the movable manipulator 2 to move the fixture 1 out of the machine tool and move it to the storage position, then the pins 3 and pin holes 4 are loosened. For batch processing of multiple workpieces with multiple fixtures 1, use a movable manipulator 2 to grab and install the fixtures 1 on the machine tool. After processing, the movable manipulator 2 uninstalls the fixtures 1 to realize automatic installation and unloading fixtures 1. It can greatly improve the processing efficiency. The structure of the mechanism and the operation are simple so that it is very reliable and easy to be realized for wide adoption among various types of CNC machining centers.

In order to simplify the grasping structure to make it more reliable, and to realize the grasping and loosening of the pin 3, the fixture 1 is provided with the pin plate 5, and several gourd-shaped pin holes are arranged in the pin plate 5. Correspondingly, the pin 3 including a column shape small-diameter section 6 and a column shape large-diameter end 7. The diameter of the small-diameter section 6 is less than or equal to the diameter of the small hole 8 of the gourd-shaped pin hole. The diameter of the large-diameter end 7 is greater than the diameter of the small hole 8 of the gourd-shaped pin hole and is less than or equal to the diameter of the large hole 9 of the gourd-shaped pin. When loading the fixture, the moving mechanism moves the pin 3 to the large hole 9 of correspondence fixture's 1 gourd-shaped pin hole and insert the pin 3 into the large hole 9, then lifts the pin 3 to let the small-diameter section 6 buckle up to the small hole 8. So that the fixture 1 is locked with the pin 3 and will not be loose. The moving mechanism moves the pin 3 to the spindle of the machine tool, the spindle chuck clamps the fixture 1, and then the pin 3 moves down to the large hole 9 and release. Similarly, the fixture 1 can be unloaded from the spindle through a similar operation, and the process is very simple and reliable.

CNC machining centers are usually equipped with tool changers so to meet different machining needs. The tool charger generally is equipped with a variety of tools on the rotating tool turret. The tool turret will also be equipped with a moving mechanism for feeding. So, the tool turret can be used to realize the function of the moving mechanism to simplify the structure. The tool turret of the machining tools is installed with processing tools and the movable manipulator 2, while installing or unloading fixture 1, the tool turret will shift the movable manipulator 2 to the working position and grab the fixture.

In order to store a large number of fixtures 1 conveniently, the machine tool is provided with the rack 10. the rack 10 is provided with several ring grooves 11 matched with the pin plates 5. The upper side of the ring groove 11 is provided with an opening, and then the pin plate of the fixture 1 is inserted and fixed into the ring groove 11 through the opening. Also, in order to fix the position of the fixture 1, the ring groove 11 and the pin plate 5 are provided with a jack 12 and a socket 13 for positioning. The jack 12 matches with the socket 13 to position the ring groove 11 and the pin plate 5.

In order to ensure that the pin 3 can smoothly inserts into the pin hole 4 and prevent any movement between the two, the edge of the pin holes 4 is provided with a chamfer 14. Correspondingly, the pin 3 is also provided with a chamfer 14 on the inner side where fits the pin hole 4, too. Through the chamfers 14 of the pin holes 4 and the pull nail 3, the pin 3 can be accurately entered into the pin hole 4 to ensure accurate positioning. The angle of the chamfer 14 is 30°.

The invention claimed is:

1. An automatic fixture replacement mechanism for machine tool, comprising multiple fixtures for installing workpieces and movable manipulator for loading the fixtures; the movable manipulator is installed on at least one two-dimensional moving mechanism, the movable manipulator is provided with pins that are buckled with at least one corresponding fixture of the multiple fixtures, and the at least one corresponding fixture is provided with pin holes matching the pins; while installing the at least one corresponding fixture, the pins of the movable manipulator and the pin holes of the at least one corresponding fixture are matched, and the moving mechanism drives the movable manipulator to move the at least one corresponding fixture and fix the at least one corresponding fixture onto the machine tool, then the pins and pin holes are loosened; when processing of the workpieces finishes, the pins of the movable manipulator match with the pin holes of the at least one corresponding fixture, and the moving mechanism drives the movable manipulator to move the at least one corresponding fixture out of the machine tool and move the at least one corresponding fixture to a storage position, then the pins and pin holes are loosened, wherein the at least one corresponding fixture includes a pin plate surrounding and protruding from an outer surface of the multiple fixtures, and wherein the pin plate includes an upper protrusion in which the pin holes are arranged.

2. The automatic fixture replacement mechanism for machine tool of claim 1, wherein the pin is provided with a column shape small-diameter section and a column shape large-diameter end, and the diameter of the small-diameter section is less than or equal to a diameter of small holes of the pin holes, the diameter of the large-diameter end is greater than the diameter of the small holes of the pin holes and is less than or equal to a diameter of large holes of the pin holes, wherein the small holes and the large holes of the pin holes are arranged vertically.

3. The automatic fixture replacement mechanism for machine tool of claim 1, wherein the moving mechanism is a tool turret of the machine tool; the tool turret of the machine tool is equipped with cutting tools and the movable manipulator; when the at least one corresponding fixture is installed or unloaded, the tool turret rotates to place the movable manipulator to a working position for grabbing fixtures.

4. The automatic fixture replacement mechanism for machine tool of claim 1, wherein the machine tool is provided with a rack for placing the multiple fixtures.

5. The automatic fixture replacement mechanism for machine tool of claim 4, wherein the rack is provided with several ring grooves matched with a lower protrusion of the pin plates; an upper side of the ring grooves are open upward, the lower protrusion of the pin plates of the multiple fixtures are inserted and fixed into the ring grooves through the upward openings.

6. The automatic fixture replacement mechanism for machine tool of claim 5, wherein the ring groove and the lower protrusion of the pin plate are provided with a jack and a socket for positioning, the jack matches with the socket to position the ring groove and the lower protrusion of the pin plate.

7. The automatic fixture replacement mechanism for machine tool of claim 1, wherein an edge of the pin holes is provided with a chamfer; correspondingly, the pin is also provided with a chamfer on an inner side where the pins fits the pin holes.

8. The automatic fixture replacement mechanism for machine tool of claim 7, wherein the angle of the chamfer is 30°.

* * * * *